United States Patent
VanBlon et al.

(10) Patent No.: US 10,664,533 B2
(45) Date of Patent: May 26, 2020

(54) SYSTEMS AND METHODS TO DETERMINE RESPONSE CUE FOR DIGITAL ASSISTANT BASED ON CONTEXT

(71) Applicant: Lenovo (Singapore) Pte. Ltd., New Tech Park (SG)

(72) Inventors: Russell Speight VanBlon, Raleigh, NC (US); Arnold S. Weksler, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 6 days.

(21) Appl. No.: 15/603,892

(22) Filed: May 24, 2017

(65) Prior Publication Data
US 2018/0342243 A1 Nov. 29, 2018

(51) Int. Cl.
| | |
|---|---|
| G06F 16/951 | (2019.01) |
| H04L 29/08 | (2006.01) |
| H04L 12/28 | (2006.01) |
| G06F 3/16 | (2006.01) |
| G06F 16/242 | (2019.01) |
| H04W 4/021 | (2018.01) |

(52) U.S. Cl.
CPC .......... *G06F 16/951* (2019.01); *G06F 3/167* (2013.01); *G06F 16/243* (2019.01); *H04L 12/2816* (2013.01); *H04L 67/18* (2013.01); *H04W 4/021* (2013.01)

(58) Field of Classification Search
CPC ........ G10L 15/22; G10L 15/30; G10L 15/08; G10L 2015/088; G10L 2015/228; G10L 2015/227; G10L 2015/223; H04L 12/2816; H04L 67/18; G06F 17/30864

USPC ........................................................ 704/251
See application file for complete search history.

(56) References Cited

U.S. PATENT DOCUMENTS

| | | | |
|---|---|---|---|
| 5,612,869 A | 3/1997 | Letzt et al. | |
| 6,616,703 B1 | 9/2003 | Nakagawa | |
| 7,219,062 B2 | 5/2007 | Colmenarez et al. | |
| 7,398,061 B2 | 7/2008 | Mousseau | |

(Continued)

FOREIGN PATENT DOCUMENTS

| | | |
|---|---|---|
| CN | 103488401 A | 1/2014 |
| CN | 103811005 B | 1/2017 |
| WO | 2018063619 A1 | 4/2018 |

OTHER PUBLICATIONS

Ming Qian, Song Wang, John Weldon Nicholson, "Activating Voice Assistant Based on at Least One of User Proximity and Context", related U.S. Appl. No. 15/217,426, Applicant's response to Final Office Action filed Jul. 20, 2018.

(Continued)

*Primary Examiner* — Bharatkumar S Shah

(74) *Attorney, Agent, or Firm* — John M. Rogitz; John L. Rogitz

(57) ABSTRACT

In one aspect, a device includes at least one processor and storage accessible to the at least one processor. The storage bears instructions executable by the at least one processor to identify at least one context and, based on the at least one context, dynamically determine a response cue for a digital assistant. The instructions are also executable by the at least one processor to, responsive to receipt of the response cue, operate the digital assistant to perform a task according to the response cue.

20 Claims, 6 Drawing Sheets

(56) References Cited

U.S. PATENT DOCUMENTS

| | | |
|---|---|---|
| 7,518,631 B2 | 4/2009 | Hershey et al. |
| 8,441,356 B1 | 5/2013 | Tedesco et al. |
| 8,660,849 B2 | 2/2014 | Gruber et al. |
| 8,719,039 B1 | 5/2014 | Sharifi |
| 8,768,712 B1 | 7/2014 | Sharifi |
| 8,913,004 B1 | 12/2014 | Bozarth et al. |
| 8,938,394 B1* | 1/2015 | Faaborg ............... G06F 3/167 704/275 |
| 9,048,963 B1 | 6/2015 | Paulus |
| 9,112,984 B2 | 8/2015 | Sejnoha et al. |
| 9,245,527 B2 | 1/2016 | Lindahl |
| 9,256,269 B2 | 2/2016 | Mallinson et al. |
| 9,257,120 B1 | 2/2016 | Guevara et al. |
| 9,263,042 B1 | 2/2016 | Sharifi |
| 9,276,541 B1 | 3/2016 | Froment et al. |
| 9,286,892 B2 | 3/2016 | Mengibar et al. |
| 9,318,107 B1 | 4/2016 | Sharifi |
| 9,318,108 B2 | 4/2016 | Gruber et al. |
| 9,361,885 B2 | 6/2016 | Ganong et al. |
| 9,367,806 B1 | 6/2016 | Cosic |
| 9,373,321 B2* | 6/2016 | Bapat .................. G10L 15/06 |
| 9,384,738 B2 | 7/2016 | Foerster et al. |
| 9,407,766 B1 | 8/2016 | Bradley et al. |
| 9,418,656 B2 | 8/2016 | Foerster et al. |
| 9,423,870 B2 | 8/2016 | Teller et al. |
| 9,424,841 B2 | 8/2016 | Foerster et al. |
| 9,542,941 B1 | 1/2017 | Weksler et al. |
| 9,584,946 B1 | 2/2017 | Lyren et al. |
| 10,068,007 B1 | 9/2018 | Wohlsen et al. |
| 10,121,494 B1 | 11/2018 | Sundaram et al. |
| 2002/0077830 A1 | 6/2002 | Suomela et al. |
| 2003/0055655 A1 | 3/2003 | Suominen |
| 2004/0044516 A1 | 3/2004 | Kennewick et al. |
| 2004/0243547 A1 | 12/2004 | Chhatrapati et al. |
| 2005/0033582 A1* | 2/2005 | Gadd .................. G06Q 30/02 704/277 |
| 2005/0091684 A1 | 4/2005 | Kawabata et al. |
| 2005/0191969 A1 | 9/2005 | Mousseau |
| 2006/0095331 A1 | 5/2006 | O'Malley et al. |
| 2008/0181140 A1 | 7/2008 | Bangor et al. |
| 2008/0224883 A1 | 9/2008 | Mock |
| 2009/0006100 A1 | 1/2009 | Badger et al. |
| 2009/0140855 A1 | 6/2009 | Shemesh et al. |
| 2009/0182560 A1 | 7/2009 | White |
| 2009/0232288 A1 | 9/2009 | Forbes et al. |
| 2009/0253463 A1 | 10/2009 | Shin et al. |
| 2009/0313014 A1 | 12/2009 | Shin |
| 2010/0009719 A1 | 1/2010 | Oh et al. |
| 2010/0280983 A1 | 11/2010 | Cho et al. |
| 2010/0333045 A1 | 12/2010 | Guéziec et al. |
| 2011/0004756 A1 | 1/2011 | Caballero et al. |
| 2011/0045812 A1 | 2/2011 | Kim et al. |
| 2011/0153323 A1 | 6/2011 | Kim et al. |
| 2011/0271194 A1 | 11/2011 | Lin et al. |
| 2011/0301958 A1 | 12/2011 | Brush et al. |
| 2012/0034904 A1 | 2/2012 | Lebeau et al. |
| 2012/0220271 A1 | 8/2012 | Goldfarb et al. |
| 2012/0262592 A1 | 10/2012 | Rabii |
| 2012/0265535 A1 | 10/2012 | Bryant-Rich et al. |
| 2012/0295708 A1 | 11/2012 | Hernandez-Abrego et al. |
| 2012/0297294 A1 | 11/2012 | Scott et al. |
| 2012/0299824 A1 | 11/2012 | Hoshuyama et al. |
| 2013/0005405 A1 | 1/2013 | Prociw |
| 2013/0021459 A1 | 1/2013 | Vasilieff et al. |
| 2013/0080178 A1 | 3/2013 | Kang et al. |
| 2013/0085757 A1 | 4/2013 | Nakamura et al. |
| 2013/0111348 A1 | 5/2013 | Gruber et al. |
| 2013/0158984 A1 | 6/2013 | Myslinski |
| 2013/0183946 A1 | 7/2013 | Jeong |
| 2013/0185078 A1 | 7/2013 | Tzirkel-Hancock et al. |
| 2013/0252569 A1 | 9/2013 | Choi |
| 2013/0253932 A1 | 9/2013 | Ariu et al. |
| 2013/0275873 A1 | 10/2013 | Shaw et al. |
| 2013/0275899 A1 | 10/2013 | Schubert et al. |
| 2013/0339020 A1 | 12/2013 | Heo et al. |
| 2013/0339028 A1 | 12/2013 | Rosner et al. |
| 2014/0028826 A1 | 1/2014 | Lee et al. |
| 2014/0142928 A1 | 5/2014 | Campbell et al. |
| 2014/0162598 A1 | 6/2014 | Villa-Real |
| 2014/0222436 A1 | 8/2014 | Binder et al. |
| 2014/0229184 A1 | 8/2014 | Shires |
| 2014/0241540 A1 | 8/2014 | Hodges et al. |
| 2014/0274203 A1 | 9/2014 | Ganong et al. |
| 2014/0282003 A1 | 9/2014 | Gruber et al. |
| 2014/0303971 A1 | 10/2014 | Yi et al. |
| 2014/0316777 A1 | 10/2014 | Cha et al. |
| 2014/0379336 A1 | 12/2014 | Bhatnagar |
| 2014/0379341 A1 | 12/2014 | Seo et al. |
| 2015/0032457 A1 | 1/2015 | Koo et al. |
| 2015/0066494 A1 | 3/2015 | Salvador et al. |
| 2015/0081296 A1 | 3/2015 | Lee et al. |
| 2015/0100322 A1 | 4/2015 | Lee et al. |
| 2015/0104041 A1 | 4/2015 | Kulavik et al. |
| 2015/0109191 A1 | 4/2015 | Johnson et al. |
| 2015/0119004 A1 | 4/2015 | Wang |
| 2015/0134334 A1 | 5/2015 | Sachidanandam et al. |
| 2015/0145770 A1 | 5/2015 | Hoshuyama et al. |
| 2015/0154954 A1 | 6/2015 | Sharifi |
| 2015/0161992 A1 | 6/2015 | Jung |
| 2015/0181328 A1 | 6/2015 | Gupta et al. |
| 2015/0187354 A1 | 7/2015 | Kim |
| 2015/0221305 A1 | 8/2015 | Sharifi |
| 2015/0230171 A1 | 8/2015 | Sun |
| 2015/0248885 A1 | 9/2015 | Koulomzin |
| 2015/0253973 A1 | 9/2015 | Chiu et al. |
| 2015/0254061 A1* | 9/2015 | Gelfenbeyn ............ G10L 15/18 704/235 |
| 2015/0255071 A1 | 9/2015 | Chiba |
| 2015/0262458 A1 | 9/2015 | Faaborg et al. |
| 2015/0281824 A1 | 10/2015 | Nguyen et al. |
| 2015/0324753 A1 | 11/2015 | Dantuluri et al. |
| 2015/0340040 A1 | 11/2015 | Mun et al. |
| 2015/0347399 A1 | 12/2015 | Aue et al. |
| 2016/0072936 A1 | 3/2016 | Kim et al. |
| 2016/0077794 A1* | 3/2016 | Kim .................... G10L 15/22 704/275 |
| 2016/0104486 A1 | 4/2016 | Penilla et al. |
| 2016/0106174 A1 | 4/2016 | Chung et al. |
| 2016/0118044 A1 | 4/2016 | Bondarev et al. |
| 2016/0154624 A1 | 6/2016 | Son et al. |
| 2016/0165047 A1 | 6/2016 | Gray et al. |
| 2016/0203700 A1 | 7/2016 | Bruhn et al. |
| 2016/0217790 A1 | 7/2016 | Sharifi |
| 2016/0249852 A1 | 9/2016 | Katsu et al. |
| 2016/0284363 A1 | 9/2016 | Borstel et al. |
| 2016/0314782 A1 | 10/2016 | Klimanis |
| 2016/0381450 A1 | 12/2016 | Taite et al. |
| 2017/0011210 A1 | 1/2017 | Cheong et al. |
| 2017/0025121 A1 | 1/2017 | Tang |
| 2017/0025122 A1 | 1/2017 | Choi |
| 2017/0092084 A1 | 3/2017 | Rihn et al. |
| 2017/0092278 A1 | 3/2017 | Evermann et al. |
| 2017/0124836 A1 | 5/2017 | Chung et al. |
| 2017/0125019 A1 | 5/2017 | Ganesan et al. |
| 2017/0132019 A1 | 5/2017 | Karashchuk et al. |
| 2017/0154626 A1 | 6/2017 | Kim et al. |
| 2017/0178001 A1* | 6/2017 | Anderson ............... G06N 5/02 |
| 2017/0182283 A1 | 6/2017 | Palmateer et al. |
| 2017/0186446 A1 | 6/2017 | Wosk et al. |
| 2017/0187860 A1 | 6/2017 | Jeong |
| 2017/0193982 A1 | 7/2017 | Agrawal et al. |
| 2017/0219367 A1 | 8/2017 | Liu et al. |
| 2017/0228520 A1 | 8/2017 | Kidd et al. |
| 2017/0278515 A1 | 9/2017 | Lee et al. |
| 2017/0279957 A1 | 9/2017 | Abramson et al. |
| 2017/0280223 A1 | 9/2017 | Cavarra et al. |
| 2017/0289676 A1 | 10/2017 | Stewart et al. |
| 2017/0322621 A1 | 11/2017 | Ueda et al. |
| 2018/0067757 A1 | 3/2018 | Rothkopf |
| 2018/0107445 A1 | 4/2018 | Ohmura |

(56) References Cited

U.S. PATENT DOCUMENTS

2018/0268814 A1 9/2018 Saganegowda et al.
2018/0342247 A1 11/2018 Nicholson et al.

OTHER PUBLICATIONS

James Anthony Hunt, Russell Speight Vanblon, John Carl Mese, Nathan J. Peterson, "Natural Language Voice Assistant", related U.S. Appl. No. 15/215,099, Non-Final Office Action dated Jun. 1, 2018.

Ming Qian, Song Wang, "System and Methods for Activating a Voice Assistant and Providing an Indicator That the Voice Assistant Has Assistance to Give", related pending U.S. Appl. No. 15/217,533, applicant's response to non-final office action filed Sep. 11, 2018.

Ming Qian, Song Wang, "Systems and Methods for Activating a Voice Assistant and Providing an Indicator that the Voice Assistant Has Assistance to Give", related U.S. Appl. No. 15/603,892, Applicants response to Final Office Action filed Apr. 23, 2018.

Ming Qian, Song Wang, John Weldon Nicholson, "Activating Voice Assistant Based on at Least One of User Proximity and Context", related U.S. Appl. No. 15/217,426, Final Office Action dated May 3, 2018.

James Anthony Hunt, Russell Speight Vanblon, John Carl Mese, Nathan J. Peterson, "Natural Language Voice Assistant", related U.S. Appl. No. 15/215,099, Applicant's response to Non-Final Office Action filed Dec. 15, 2017.

Ming Qian, Song Wang, John Weldon Nicholson, "Activating Voice Assistant Based on at Least One of User Proximity and Context", related U.S. Appl. No. 15/217,426, Applicant's response to Non-Final Office Action filed Dec. 26, 2017.

James Anthony Hunt, Russell Speight Vanblon, John Carl Mese, Nathan J. Peterson, "Natural Language Voice Assistant", related U.S. Appl. No. 15/215,099, Final Office Action dated Nov. 2, 2018.

James Anthony Hunt, Russell Speight Vanblon, John Carl Mese, Nathan J. Peterson, "Natural Language Voice Assistant", related U.S. Appl. No. 15/215,099, Final Office Action dated Mar. 2, 2018.

James Anthony Hunt, Russell Speight Vanblon, John Carl Mese, Nathan J. Peterson, "Natural Language Voice Assistant", related U.S. Appl. No. 15/215,099, Non-Final Office Action dated Oct. 3, 2017.

Ming Qian, Song Wang, "Systems and Methods for Activating a Voice Assistant and Providing an Indicator that the Voice Assistant Has Assistance to Give", related U.S. Appl. No. 15/217,533, Applicants response to Final Office Action filed Apr. 23, 2018.

James Anthony Hunt, Russell Speight Vanblon, John Carl Mese, Nathan J. Peterson, "Natural Language Voice Assistant", related U.S. Appl. No. 15/215,099, Applicants response to Final Office Action filed Apr. 23, 2018.

Ming Qian, Song Wang, "Systems and Methods for Activating a Voice Assistant and Providing an Indicator that the Voice Assistant has Assistance to Give", related U.S. Appl. No. 15/217,533, Non-Final Office Action dated Jun. 15, 2018.

Ming Qian, Song Wang, John Weldon Nicholson, "Activating Voice Assistant Based on at Least One of User Proximity and Context", related U.S. Appl. No. 15/217,426, Non-Final Office Action dated Nov. 30, 2017.

James Anthony Hunt, Russell Speight Vanblon, John Carl Mese, Nathan J. Peterson, "Natural Language Voice Assistant", related U.S. Appl. No. 15/215,099, Applicants response to Non-Final Office fiction filed Jul. 11, 2018.

Ming Qian, Song Wang, "Systems and Methods for Activating a Voice Assistant and Providing an Indicator that the Voice Assistant has Assistance to Give", related U.S. Appl. No. 15/217,533, Applicant's response to Non-Final Office Action filed Dec. 12, 2017.

Ming Qian, Song Wang, "Systems and Methods for Activating a Voice Assistant and Providing an Indicator that the Voice Assistant has Assistance to Give", related U.S. Appl. No. 15/217,533, Final Office Action dated Feb. 9, 2018.

Ming Qian, Song Wang, "Systems and Methods for Activating a Voice Assistant and Providing an Indicator That the Voice Assistant Has Assistance to Give", related U.S. Appl. No. 15/217,533, Non-Final Office Action dated Sep. 28, 2017.

Ming Qian, Song Wang, "Systems and Methods for Activating a Voice Assistant and Providing an Indicator That the Voice Assistant Has Assistance to Give", file history of related U.S. Appl. No. 15/217,533, filed Jul. 22, 2016.

Ming Qian, Song Wang, John Weldon Nicholson, "Activating Voice Assistant Based on at Least One of User Proximity and Context", file history of related U.S. Appl. No. 15/217,426, filed Jul. 22, 2016.

James Anthony Hunt, Russell Speight Vanblon, John Carl Mese, Nathan J. Peterson, "Natural Language Voice Assistant", file history of related U.S. Appl. No. 15/215,099, filed Jul. 20, 2016.

Arnold S. Weksler, John Carl Mese, Nathan J. Peterson, Russell Speight Vanblon, "Situationally Suspending Wakeup Word to Enable Voice Command Input", related U.S. Appl. No. 14/872,587, filed Oct. 1, 2015, now U.S. Pat. No. 9,542,941.

Ming Qian, Song Wang, John Weldon Nicholson, "Activating Voice Assistant Based on at Least One of User Proximity and Context", related U.S. Appl. No. 15/217,426, Applicant's response to Non-Final Office Action filed Jan. 23, 2019.

Ming Qian, Song Wang, "Systems and Methods for Activating a Voice Assistant and Providing an Indicator that the Voice Assistant Has Assistance to Give", related U.S. Appl. No. 15/217,533, Final Office Action dated Nov. 19, 2018.

Ming Qian, Song Wang, John Weldon Nicholson, "Activating Voice Assistant Based on at Least One of User Proximity and Context", related U.S. Appl. No. 15,217,426, Non-Final Office Action dated Nov. 9, 2018.

Ming Qian, Song Wang, John Weldon Nicholson, "Activating Voice Assistant Based on at Least One of User Proximity and Context", related U.S. Appl. No. 15/217,426, Final Office Action dated Apr. 10, 2019.

Qian et al., "Activating Voice Assistant Based on at Least One of User Proximity and Context", related U.S. Appl. No. 15/217,426, Applicant's response to Final Office Action filed Aug. 6, 2019.

* cited by examiner

700

SETTINGS

❏ ENABLE DYNAMIC DETERMINATION OF RESPONSE CUES —702

❏ STILL ALSO USE PREDETERMINED WAKE UP WORD —704

---

❏ USE AS MANY RESPONSE CUES AS POSSIBLE; —706

709      OR

❏ LIMIT TO [$\alpha$] CUES TO SAVE POWER —708

---

IF LIMITING POWER, USE:

❏ NEAREST USER —710

OR

❏ RANKING   [EST. RANKING]—714
      712

720

❏ ENTER RESPONSE CUE(S) FOR [RUSSELL]:
     716

[_____]—718

---

SELECT CONTEXT TO USE, IF DESIRED: —720

❏ USER

❏ LOCATION

❏ TIME OF DAY

❏ ELECTRONIC CALENDAR APPOINTMENT

❏ HOME APPLIANCE OPERATION

❏ DRIVING VEHICLE/TRAVEL

❏ ALL

FIG. 7

SYSTEMS AND METHODS TO DETERMINE RESPONSE CUE FOR DIGITAL ASSISTANT BASED ON CONTEXT

BACKGROUND

As recognized herein, many emerging consumer electronics devices in today's technology marketplace come equipped with digital assistants that can process audible user input and return an output based on the user input, such as returning an answer to a question posed by a user. However, the user typically has to first provide a predetermined "wake up word" to the digital assistant for the digital assistant to then begin listening for an ensuing question or request for which to return an answer. However, this can be frustrating to the user for a number of reasons, such as forgetting the predetermined wake up word itself or forgetting to provide the predetermined wake up word but still expecting a response to a question that is posed. There are currently no adequate solutions to the foregoing computer-related, technological problem.

SUMMARY

Accordingly, in one aspect a device includes at least one processor and storage accessible to the at least one processor. The storage bears instructions executable by the at least one processor to identify at least one context and, based on the at least one context, dynamically determine a response cue for a digital assistant. The instructions are also executable by the at least one processor to, responsive to receipt of the response cue, operate the digital assistant to perform a task according to the response cue.

In another aspect, a method includes identifying, using a device, at least a first factor usable to dynamically determine a first response cue for a personal assistant and dynamically identifying, using the device, the first response cue based at least in part on the first factor. The method also includes activating, at the device, the personal assistant to provide a response based at least in part on the first response cue.

In yet another aspect, an apparatus includes a first processor, a network adapter, and storage bearing instructions. The instructions are executable by a second processor of a device for identifying at least one context and dynamically determining, based on the at least one context, a response cue for a digital assistant. The instructions are also executable by the second processor for activating, responsive to receipt of the response cue, the digital assistant to respond to the response cue. The first processor transfers the instructions to the device over a network via the network adapter.

The details of present principles, both as to their structure and operation, can best be understood in reference to the accompanying drawings, in which like reference numerals refer to like parts, and in which:

BRIEF DESCRIPTION OF THE DRAWINGS

FIGS. 7-9 show example user interfaces (UIs) in accordance with present principles.

DETAILED DESCRIPTION

Figure 1:
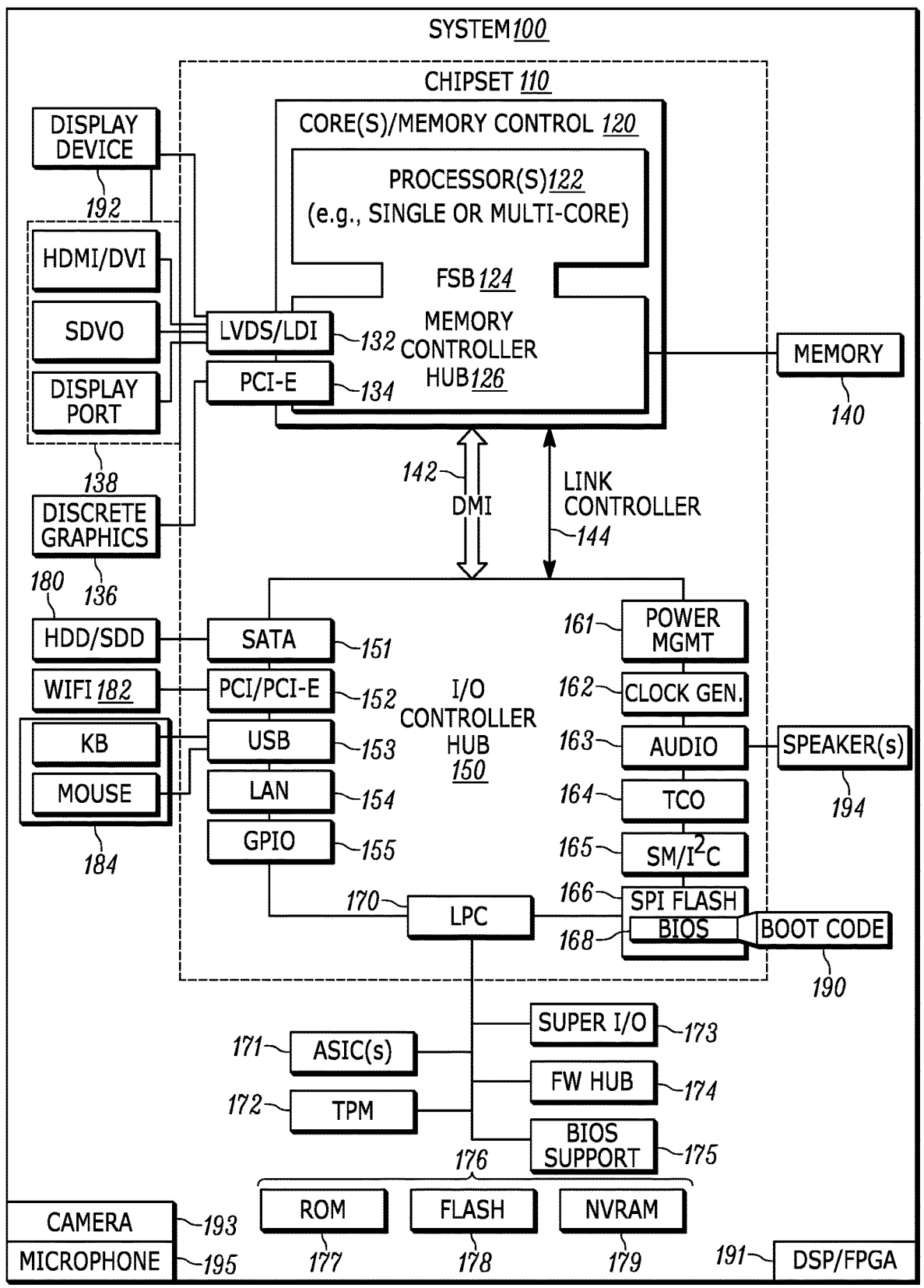
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multimaster serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, in some embodiments the system 100 may include a digital signal processor (DSP) and/or field programmable gate array (FPGA) 191 that communicates with the processor(s) 122 (that may be general-purpose processors). In addition to communicating with each other, both of the DSP/FPGA 191 and the processor(s) 122 may receive input from an audio receiver/microphone 193 that provides the input based on audio that is detected at the microphone 193, such as via a user providing audible input to the microphone 193. Both of the DSP/FPGA 191 and the processor(s) 122 may also receive input from a camera 195 that gathers one or more images of the surroundings of the system 100. The camera 195 may be a thermal imaging camera, a digital camera such as a webcam, a three-dimensional (3D) camera, and/or a camera otherwise integrated into the system 100 and controllable by the processor 122 to gather pictures/images and/or video.

Additionally, though not shown for clarity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
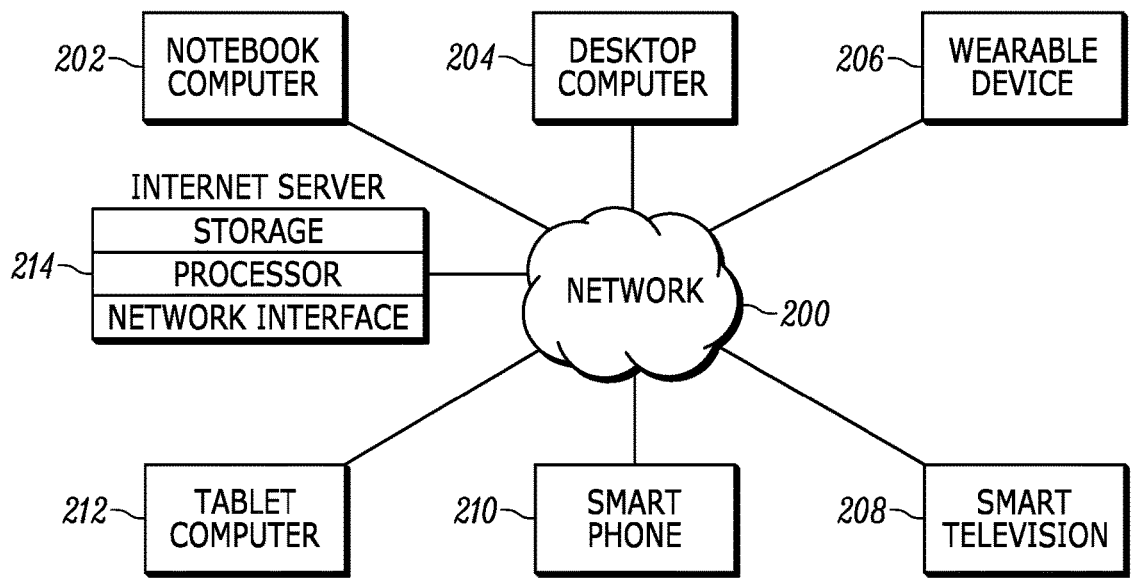
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles, such as searching for information complying with a user request.

Figure 3:
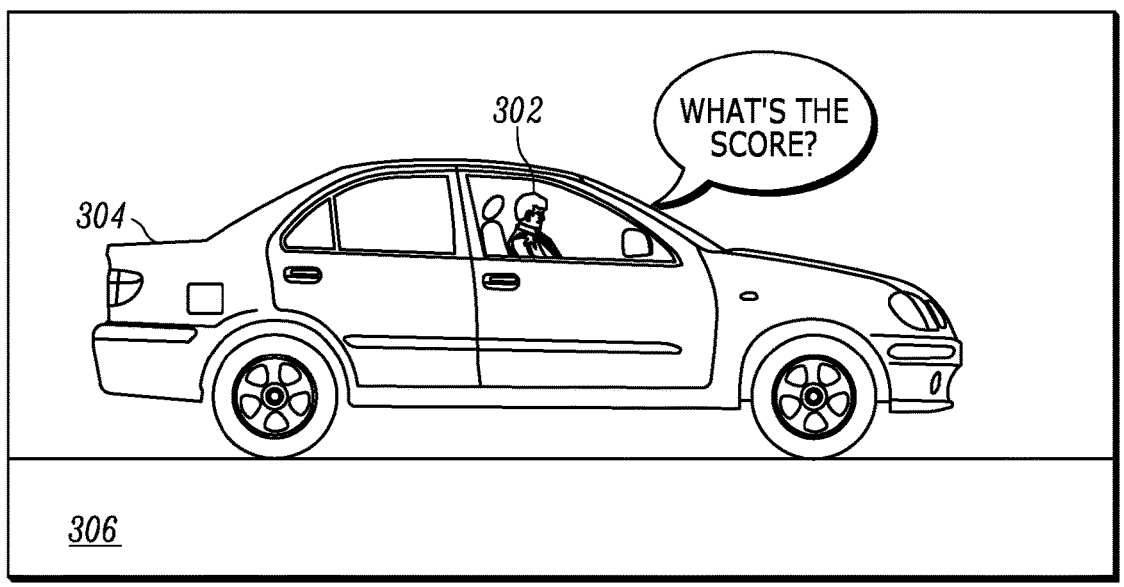
FIGS. 3-5 are example illustrations in accordance with present principles.

Now in reference to FIG. 3, an example illustration 300 in accordance with present principles is shown. A person 302 is shown driving a motor vehicle 304 along a highway 306. While driving, the person 302 poses a question to a personal/digital assistant executing on the person's smartphone that is not shown but understood to be inside the vehicle 304. Specifically, the person 302 asks "What's the score?"

Because the assistant has identified the context of driving as being currently engaged in by the person 302, such as based on Bluetooth communication of the smartphone with the vehicle's computing system, the assistant may have dynamically determined that a response cue of "What's the score?" might be asked while the person 302 drives prior to it actually being asked by the person 302. This may be because the person 302 might not ask the assistant about anything related to driving itself as the person 302 is already doing that activity. However, the person 302 might still wish to ascertain the score of a sporting event that is currently ongoing but that the person 302 is currently unable to receive information on because he or she is driving. Thus, the assistant may have already been listening for "What's the score?" so that when it has been actually spoken by the person 302 the assistant may use it as a cue to identify the live score of a sporting event for a particular team with which the person 302 is associated and provide a response to the person 302 indicating the live score. If the person 302 were instead identified as actually watching the game on a television, the response cue of "What's the score?" would be less likely in this example because the person 302 would be more likely to already know the score, and thus other response cues may be listened for instead.

It may be appreciated from the foregoing that the use of a "wake up" word or phrase for digital assistant other than the response cue itself is not used. For instance, the dynamically determined response cue of "What's the score?" that the assistant may have been listening for need not be preceded by a static wake up phrase (e.g., "Hey, assistant" or "Okay, assistant") in order to respond.

Figure 4:
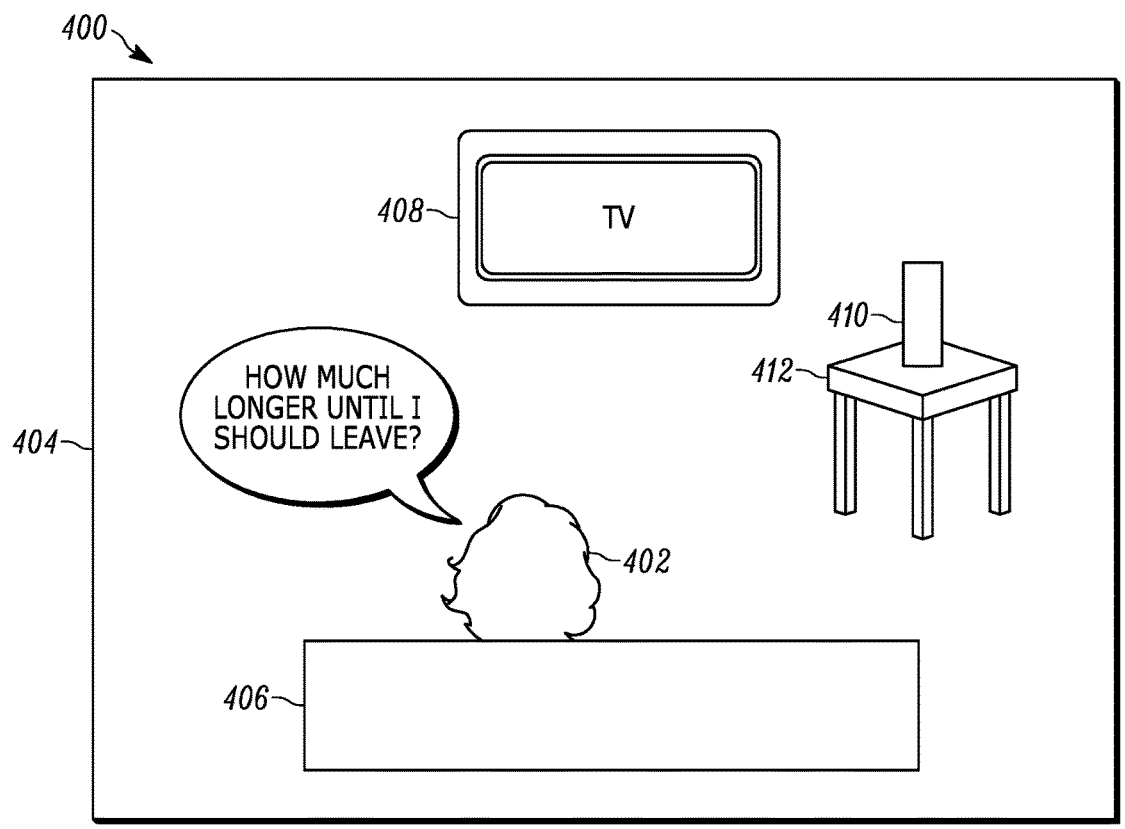
Figure 5:
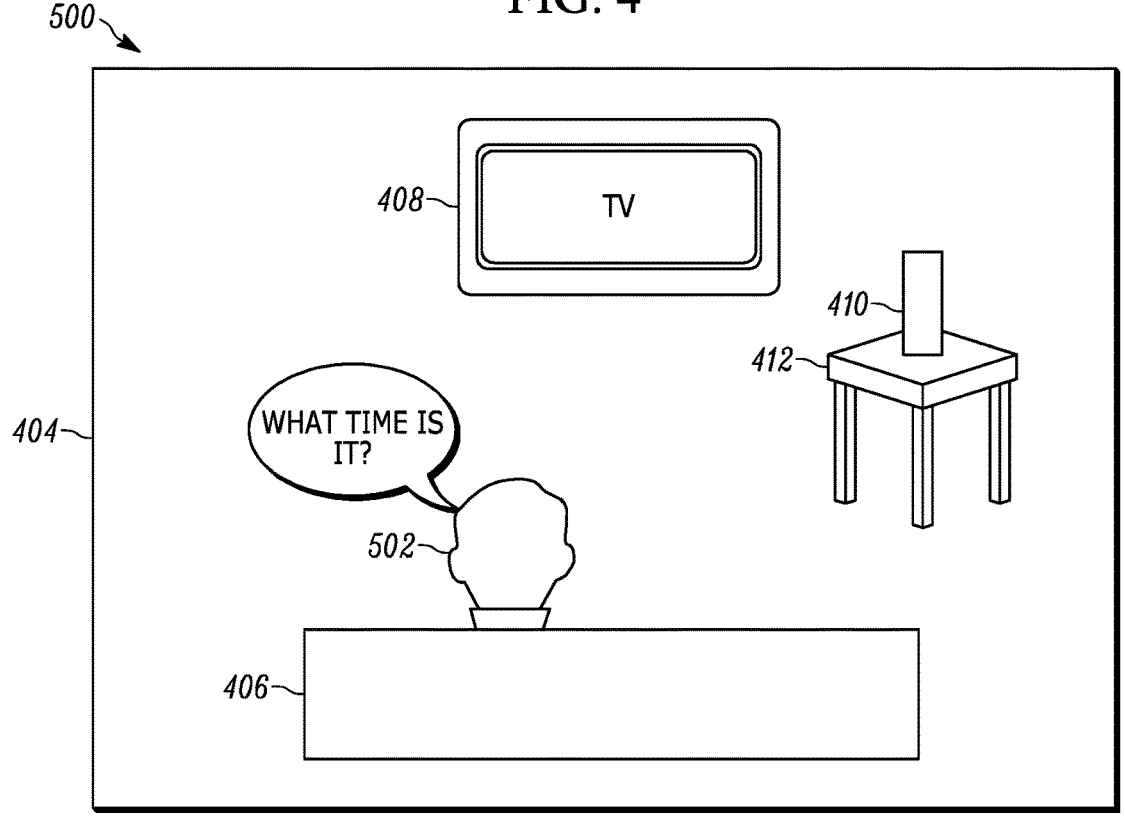

Now in cross-reference to FIGS. 4 and 5, respective illustrations 400, 500 are shown. A first user 402 is shown in illustration 400, while a second user 502 that is different from the user 402 is shown in illustration 500. The illustrations 400, 500 are understood to show the same room 404 within a personal residence, but at different times of the same day. At those different times, both of the users 402, 502 are sitting on a couch 406 watching audio video content presented via a television 408.

As may also be appreciated from FIGS. 4 and 5, a stand-alone device 410 operating a personal assistant application in accordance with present principles is disposed on a table 412 in the room 404. The personal assistant may identify each of the users 402, 502 while they are each present in the room. For example, the personal assistant may identify each user based on communication with his or her respective smartphone that might be on his or her person, based on images gathered by a camera in communication with or actually on the stand-alone device 410 to then identify the respective user via facial recognition software, and/or based on audio gathered by a microphone in communication with or actually on the stand-alone device 410 to then identify the respective user via voice recognition software.

Once the respective user is identified, different response cues that might be spoken by each user may be identified based on identification of the respective user. As shown in FIG. 4, the first user 402 may ask "How much longer until I should leave?" The response cue may be the entire phrase itself, or only a portion thereof such as "How much longer". In any case, after identifying the user 402 as present in the room 404, the personal assistant may access an electronic calendar associated with the user 402 and identify any upcoming events indicated in the electronic calendar that are indicated as being at a location other than the current location of the user 402, such as those coming up within a threshold period of time of a current time of day at various other locations. After identifying that at least one event that is indicated in the calendar is upcoming and to take place at a different location, the device may dynamically determine and listen for a response cue based on that of "How much longer" or "How much longer until I should leave?" in expectation that the user might provide such a response cue based on his or her knowledge that an event is upcoming and that he or she will still need to travel to the location of the event.

Thus, when the user provides a response cue such as "How much longer until I should leave?", the audible input may be sensed by a microphone on or otherwise in communication with the device 410 that is executing the personal assistant. The personal assistant may then recognize the response cue based on the audible input and audibly provide a response through a speaker on the device 410, such as a time at which the user 402 should begin traveling to the location of the event to make it on time based on a calculation of an estimated driving time to the location of the upcoming event from a current location of the user. The current location of the user may be identified, for example, based on identification of current GPS coordinates for the smartphone of the user 402 as indicated by a GPS transceiver on the smartphone.

Should the user 402 then leave the room 404 for his or her event and the user 502 then enter the room and take a seat on the couch 502, the assistant operating at the device 410 may identify the user 502 and dynamically determine one or more different response cues that might be spoken by the user 502 instead of the user 402. For example, should the user 502 typically ask a certain question of the assistant while watching television, such as asking a certain question a threshold number of previous times immediately after providing a predetermined and non-context-specific wake up phrase, the assistant may listen for that same question and use it as a cue for which it is to provide a response to the user 502 without also receiving the non-context-specific wake up phrase.

In the example shown in FIG. 5, the dynamically determined response cue may be "What time is it?" When spoken by the user, the assistant may recognize this response cue by executing voice recognition on input from a microphone that detected the response cue as spoken by the user 502. The assistant may then identify the current time of day from, for example, a clock application executing at the device 410 and then provide an audible output of the current time of day via a speaker on the device 410.

Figure 6:
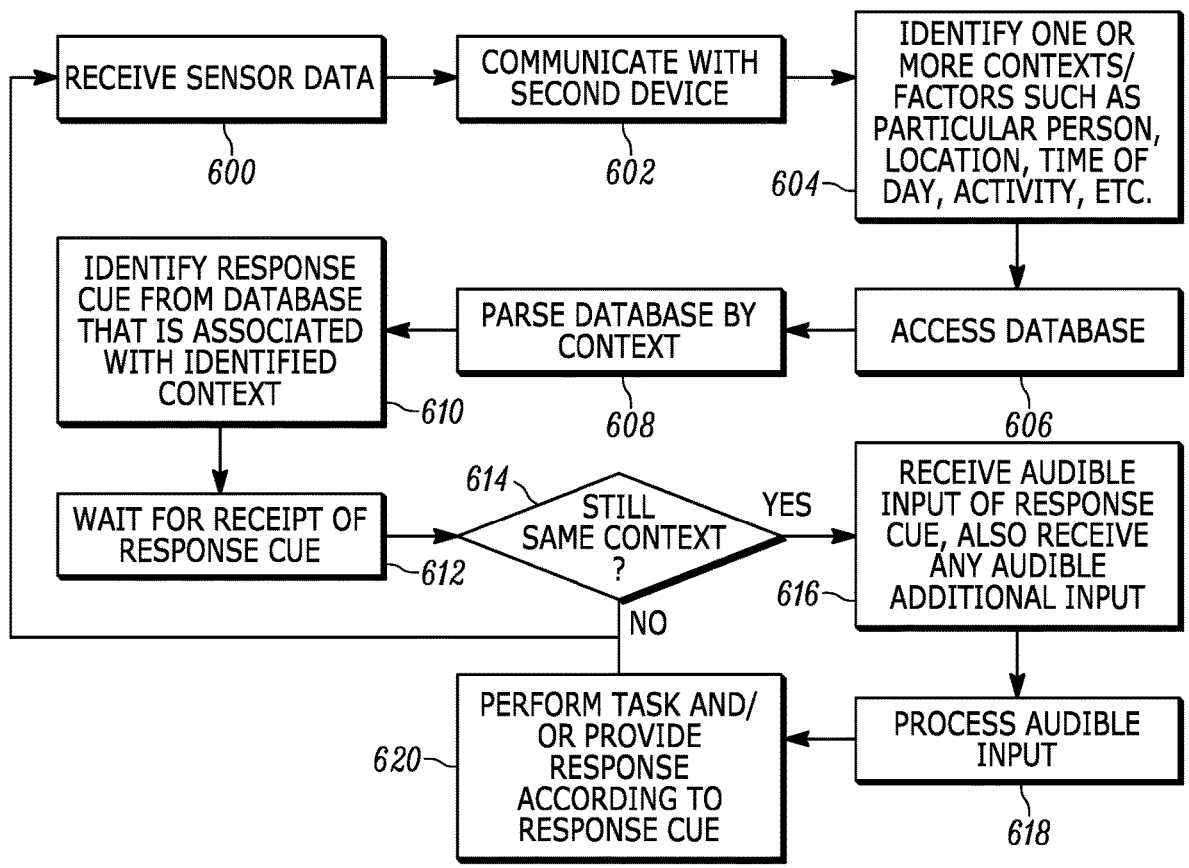
FIG. 6 is a flow chart of an example algorithm in accordance with present principles.

Continuing the detailed description in reference to FIG. 6, it shows example logic that may be executed by a first device (such as the system 100) in conjunction with and/or as part of operation of a digital assistant in accordance with present principles. Beginning at block 600, the logic may receive sensor data, such as data from a microphone or camera on the device. The logic may then move to block 602 where the logic may communicate with a second device such as a home appliance or a user's smartphone (e.g., if the assistant is being operated at a device other than the smartphone).

From block 602 the logic may then proceed to block 604. At block 604 the logic may, based on the sensor data and/or communication with the second device, identify one or more contexts or factors for dynamic determination of one or more response cues for which to await input. E.g., the contexts/factors may include presence of a particular person within a location, a current time of day, an activity currently engaged in by the user, etc.

Providing an example, a context of a particular activity being engaged in by a user may be identified based on communication with the second device to determine the particular activity being engaged in using the second device. Additionally or alternatively, the activity may be determined based on input from the microphone and/or camera so that sound recognition or gesture recognition may be respectively executed using the input to determine the activity.

From block 604 the logic may proceed to block 606. At block 606 the logic may access a database, such as a relational database correlating potential contexts/factors that might be identified with respective potential response cues that might be spoken by a user in the associated context. The database may be stored locally at the first device, and/or may be stored remotely at another storage location to which the first device has remote access. Once accessed, the database may be parsed based on context at block 608 to, at block 610, identify a context entry in the database corresponding to the context identified at block 604 and thus identify one or more response cues correlated in the database with the given context.

From block 610 the logic may proceed to block 612 where the logic may await audible input of the one or more response cues identified at block 610. The logic may then proceed to decision diamond 614 where, while waiting, the logic may determine if the same context identified at block 604 still exists. For instance, at diamond 614 the logic may again identify one or more contexts as described above in reference to block 604 to determine if a same context as before still exists.

A negative determination at diamond 614 may cause the logic to move back to block 600 and proceed therefrom. However, an affirmative determination at diamond 614 may instead cause the logic to move from diamond 614 to block 616. At block 616 the logic may receive audible input of at least one of the response cues identified at block 610, and may also receive any additional audible input beyond the response cue that might be also provided by the user with the response cue as part of, for example, a query for information. The logic may then move to block 618 where the logic may process the audible input received at block 616 to, at block 620, identify a task to be performed or a response to provide according to the response cue and any additional audible input that may have been provided.

Providing an example of a task to be performed, it may be for the first device to send a text message or to initiate a telephone call. The task may be performed based on a context of driving being identified, and then a response cue of "Send a text message to" or "Place a call to" being identified and then received along with audible input of a particular recipient. In response, the assistant may either perform the task of initiating a text message or call to the specified recipient.

Reference is now made to FIG. 7. FIG. 7 shows an example user interface (UI) 700 presentable on a display accessible to a device for configuring settings of a digital/personal assistant in accordance with present principles. The UI 700 may include a first option 702 that is selectable using the check box shown adjacent to it to enable the digital/personal assistant to dynamically determine response cues as described herein. The other options discussed below may also be selected based on selection of the respective check box shown adjacent to each one. Thus, a second option 704 is also presented on the UI 700 that is selectable to configure the device/assistant to still also listen for a predetermined, static wake up word or phrase in addition to any dynamically determined response cues that might be determined and listened for based on context.

Still further, the UI 700 may include options 706 and 708 that are alternatively selectable to either configure the device/assistant to listen for as may response cues as might be dynamically determined based on context regardless of power consumption that might be used for such listening (option 706), or to configure the device/assistant to limit the number of response cues that are dynamically determined to save power (option 708). The user may even enter into number entry box 709 a particular maximum number of response cues for which to listen but still save some power. The response cues that are selected per the maximum in a given instance if option 708 is enabled may be prioritized in an order of most-likely to be used, such as may be determined by accessing a history of past response cue uses to determine which have been used more often than others in the past for a given context. Response cues selected so as to not exceed the maximum may also be selected by choosing those that might be used by a most-proximate user to the device where multiple people are determined to be present at a location of the device, or by selecting response cues for a higher-ranked user of among plural users that are present.

Accordingly, option 710 may be presented on the UI 700 and may be selectable to enable power saving by listening for response cues only from a most-proximate user. Option 712 may also be presented and may be selectable to enable power saving by listening for response cues based on a user ranking that may be established and/or changed by selecting selector 714 that in turn may cause another UI to be presented at which a person may provide input to rank users in priority from highest to lowest.

Still further, the UI 700 may include an option 716 for a person to specify a particular response cue (via text entry box 718) for which to listen when a particular user or other context specified via input box 720 is determined to be present.

Additionally, options 720 may be presented that are each respectively selectable to specify particular contexts for the device/assistant to identify and in turn dynamically determine appropriate response cues in accordance with present principles. The example contexts listed include presence of a particular user, location of a particular user or their associated device, current time of day, upcoming appointments as indicated in an electronic calendar, operation of a home appliance, and driving a vehicle or otherwise traveling. Note that the last-listed of the options 720 is selectable to select all contexts the device is able to identify.

Figure 8:
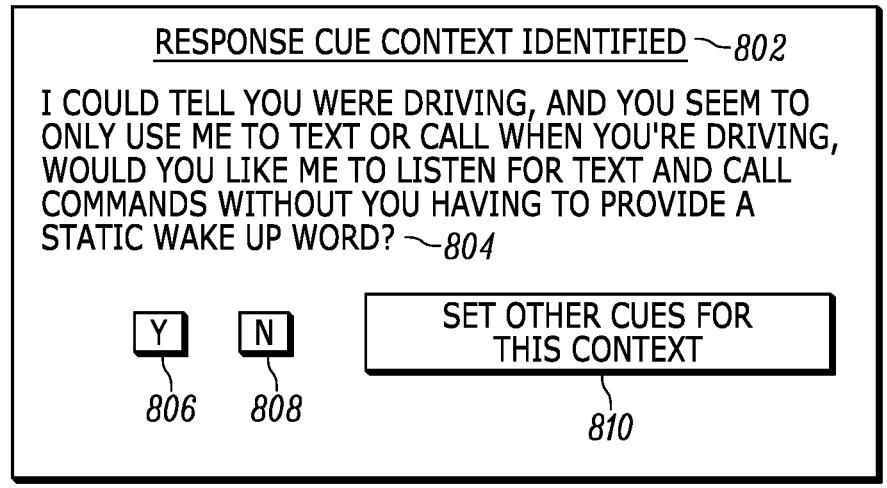

Now in reference to FIG. 8, an example UI/prompt 800 is shown that may be presented on a display accessible to a device undertaking present principles. The prompt 800 may be presented, for example, when a response from a digital assistant has been requested via audible input and the digital assistant has identified a context that it can associate with the audible input as a response cue for which to listen in the future when future identifications of the same context are made. For example, should a user normally provide a certain command while in a given context (e.g., at least a threshold number of times) immediately after providing a non-context-specific wake up phrase, the assistant may either automatically associate in a relational database the command with the context as a potential response cue for which to listen in the future, or it may present the prompt 800.

The prompt 800 may provide an indication 802 that a potential response cue and associated context have been identified. The prompt 800 may also include text 804 indicating that the assistant has determined that the user was driving (the identified context in this example) and that the user seems to only use the assistant to text or call when driving. The text 804 may also ask whether the user would like the assistant to listen for text and call commands as response cues in the driving context without the user also having to first provide a predetermined, static wake up phrase that would be useable regardless of any identified context (such as "hey assistant").

Thus, a yes selector 806 may be presented and may be selectable for the user to provide input that the user would like the assistant to listen for text and call commands as response cues in the driving context. A no selector 808 may also be presented and may be selectable for the user to provide input that the user would not like the assistant to listen for text and call commands as response cues in the driving context.

Additionally, a selector 810 may also be presented on the prompt 800 that is selectable to command the device to present another user interface at which other response cues may be specified by the user for the identified context of driving. For example, selection of the selector 810 may cause the device to present a UI that has an option and text entry box similar to the option 716 described above, or selection of the selector 810 may cause the device to present the UI 700 itself in other embodiments.

Figure 9:
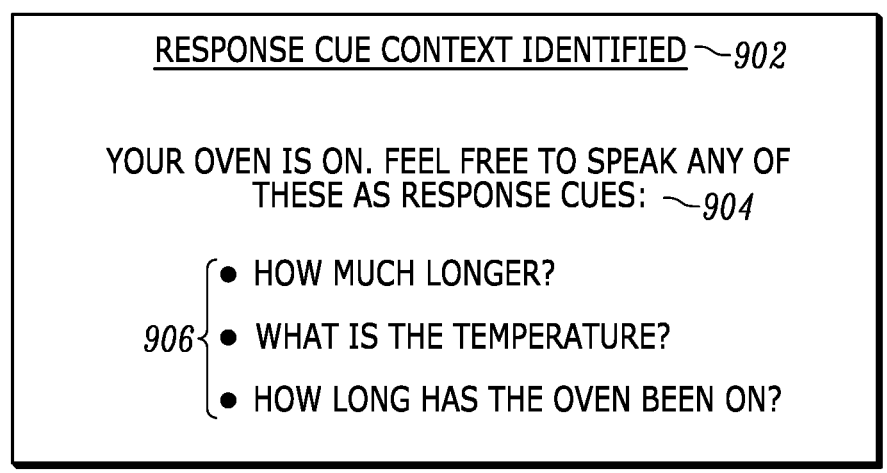

Before moving on to the description of FIG. 9, it is to be understood that a prompt such as the prompt 800 may be presented responsive to conclusion of the identified context. Thus, in this example so as to not distract the user while driving, the prompt 800 may be presented responsive to a determination that driving has ceased but may not be presented before that point.

Now in reference to FIG. 9, yet another example UI/prompt 900 is shown that may be presentable on a display accessible to a device undertaking present principles. The prompt 900 may provide an indication 902 that a potential response cue and associated context have been identified. The prompt 900 may also include text 904 indicating that the assistant has determined that a smart oven home appliance is on (the identified context in this example) and that the user can speak certain response cues 906 listed on the prompt 900 in order to elicit a response from the assistant in conformance with the response cue. The response cues 906 may be identified based on a history of previous questions and commands provided by the user to the assistant, and/or they may be identified even without any such history but based merely on the assistant communicating with the smart oven to determine that it is on and identification from a relational database of potential response cues associated with an oven being on.

Moving on from FIG. 9, it is to be understood that in some examples, some response cues (or at least portions thereof) may overlap. For example, if a wife were in the same room as her husband and she has an upcoming appointment, the response cue for the wife may be set to "How much longer until I should leave?" while the response cue for the husband or any other family member in the room (while the family's stove is on) may be set to "How much longer until dinner?" Thus, since there is commonality in those questions, both questions could be listened for simultaneously with a response cue being "how much longer" and any additional audible input received after that helping determine the appropriate response. This may allow the assistant more latitude to ready itself to receive still other response cues for other simultaneous contexts that might be identified, and/or may simply allow the assistant to save power on the device by listening for a single response cue of "how much longer"

rather than both of "How much longer until I should leave?" and "How much longer until dinner?"

Providing still other examples where a response cue may be dynamically determined, an assistant may listen for "What time is it?" when the assistant determines that a calendar event is approaching and that the user has typically asked that question in the past with an event approaching. An assistant, while the user is driving, may identify the driving context and listen for "How many more miles?" so that it can provide a response to that question should it actually be asked. As yet another example, in A.M. hours and based on a user typically asking "What's the weather?" while in a particular location such as the user's kitchen, the assistant may dynamically determine to listen for that question during A.M. hours and while the user is in the kitchen.

It is to be understood that an assistant in accordance with present principles may also listen for different response cues from different people simultaneously. Moreover, in some examples potential response cues may vary based on whether a user is alone or with other people or with certain groups of people that may be identified. Presence of a user may be determined via detecting his or her personal device (e.g., his or her smartphone or wearable device) at a given location using a GPS transceiver on the personal device and assuming the user is proximate to the personal device. Camera and microphone input may also be used to detect which users might be present in a given context.

Additionally, it is to be understood that in some embodiments a digital/personal assistant in accordance with present principles may be implemented using both a general-purpose processor/central processing unit (CPU) and also a dedicated processor such as a digital signal processor (DSP) or field programmable gate array (FPGA). In such an embodiment, the DSP or FPGA may operate the assistant in a low power mode to recognize particular response cues in the first place and pass control to the general-purpose processor/CPU, which may then operate the assistant to actually respond to a user question or command. However, it is to be further understood that in other embodiments, the general-purpose processor/CPU may operate the assistant for both response cues and providing responses to associated user questions and commands.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor and bearing instructions executable by the at least one processor to:
   identify at least one context;
   receive, at least a threshold number of times during occurrence of the context, a static first wake up phrase along with a command;
   present a graphical user interface (GUI) on a display based on receipt of the static first wake up phrase along with the command the threshold number of times during occurrence of the context, the GUI comprising a prompt asking whether the device should take action in the future based on the command being received in the future during one or more future occurrences of the context without also receiving the static first wake up phrase in the future, the GUI comprising a selector at which user input is receivable to set the device to take action based on the command being received in the future during the one or more future occurrences of the context without also receiving the static first wake up phrase during the one or more future occurrences;
   based on selection of the selector, and based on the at least one context occurring in the future and the command being received while the context occurs in the future, use the command as a second wake up phrase and operate, without receiving the static first wake up phrase, a digital assistant to perform a task according to the second wake up phrase.

2. The device of claim 1, wherein the task is to provide a response to a query indicated with the second wake up phrase.

3. The device of claim 1, wherein the at least one context comprises a current location of the first device.

4. The device of claim 1, wherein the at least one context comprises a current time of day.

5. The device of claim 1, wherein the at least one context is associated with an activity identified as currently engaged in by the user, and wherein the second wake up phrase is associated with something other than the activity identified as currently engaged in by the user.

6. The device of claim 1, wherein the at least one context is associated with an event indicated in an electronic calendar, and wherein the second wake up phrase is associated with the event in the electronic calendar.

7. The device of claim 1, wherein the at least one context is identified based on communication of the first device with a home appliance, and wherein the second wake up phrase is associated with a function of the home appliance.

8. The device of claim 1, wherein the instructions are executable by the at least one processor to:
   identify the presence of the first user;
   identify at least one context associated with the first user;
   based on the at least one context associated with the first user, dynamically determine the second wake up phrase to invoke the digital assistant;
   responsive to receipt of the second wake up phrase, operate the digital assistant to perform a task according to the second wake up phrase;
   subsequent to performance of the task according to the second wake up phrase, identify the presence of a second user different from the first user;
   identify at least one context associated with the second user;

based on the at least one context associated with the second user, dynamically determine a third wake up phrase to invoke the digital assistant, the third wake up phrase comprising different words from the first and second wake up phrases; and responsive to receipt of the third wake up phrase, operate the digital assistant to perform a task according to the third wake up phrase.

9. A method, comprising:

identifying, using a device, at least one context;

receiving, at the device at least a threshold number of times during occurrence of the context, a static first wake up phrase along with a command;

presenting a graphical user interface (GUI) on a display based on receipt of the static first wake up phrase along with the command the threshold number of times during occurrence of the context, the GUI comprising a prompt asking whether the device should take action in the future based on the command being received in the future during one or more future occurrences of the context without also receiving the static first wake up phrase in the future;

based on a user response to the prompt, and based on the at least one context occurring in the future and the command being received while the context occurs in the future, using the command as a second wake up phrase and operating, without receiving the static first wake up phrase, a digital assistant to perform a task according to the second wake up phrase.

10. The method of claim 9, wherein identifying the at least one context comprises identifying one or more of: a location of the device, a time of day.

11. The method of claim 9, wherein the at least one context is associated with an activity identified as currently engaged in by a person, and wherein the second wake up phrase is associated with the activity identified as currently engaged in by the person.

12. The method of claim 9, wherein the at least one context is associated with travel to a destination, and wherein the second wake up phrase is associated with a remaining distance to the destination.

13. An apparatus, comprising:

a first processor;

a network adapter; and storage bearing instructions executable by a second processor of a device for:

identifying at least one context;

receiving, at least a threshold number of times during occurrence of the context, a static first wake up phrase along with a command;

presenting a graphical user interface (GUI) on a display based on receipt of the static first wake up phrase along with the command the threshold number of times during occurrence of the context, the GUI comprising a prompt asking whether the device should take action in the future based on the command being received in the future during one or more future occurrences of the context without also receiving the static first wake up phrase in the future;

based on a user response to the prompt, and based on the at least one context occurring in the future and the command being received while the context occurs in the future, using the command as a second wake up phrase and operating, without receiving the static first wake up phrase, a digital assistant to perform a task according to the second wake up phrase;

wherein the first processor transfers the instructions to the device over a network via the network adapter.

14. The apparatus of claim 13, wherein the digital assistant is also concurrently able to be activated based on receipt of the static first wake up phrase, the static first wake up phrase not being dynamically determined based on context.

15. The device of claim 1, wherein the GUI is presented responsive to conclusion of an occurrence of the at least one context during which the static first wake up phrase was received along with the command.

16. The device of claim 5, wherein the at least one context comprises the user driving a vehicle, and wherein the second wake up phrase is associated with making a telephone call or sending a text message.

17. The method of claim 9, wherein the GUI comprises a selector at which the user response is receivable based on selection of the selector, the user response being used to set the device to take action based on the command being received in the future during the one or more future occurrences of the context without also receiving the static first wake up phrase during the one or more future occurrences.

18. The method of claim 9, wherein the GUI is presented responsive to conclusion of an occurrence of the at least one context during which the static first wake up phrase was received along with the command.

19. The apparatus of claim 13, wherein the GUI comprises a selector at which the user response is receivable based on selection of the selector, the user response being used to set the device to take action based on the command being received in the future during the one or more future occurrences of the context without also receiving the static first wake up phrase during the one or more future occurrences.

20. The apparatus of claim 13, wherein the GUI is presented responsive to conclusion of an occurrence of the at least one context during which the static first wake up phrase was received along with the command.

* * * * *